United States Patent

Meichsner

[11] 3,807,602
[45] Apr. 30, 1974

[54] METHOD AND APPARATUS FOR DISPENSING A FLUIDIZABLE SOLID FROM A PRESSURE VESSEL

[75] Inventor: Walter Meichsner, Homberg, Germany

[73] Assignee: August Thyssen-Hutte AG, Duisburg, Germany

[22] Filed: July 10, 1972

[21] Appl. No.: 270,397

[52] U.S. Cl. .................. 222/1, 222/77, 222/193
[51] Int. Cl. ............................................. G01g 13/26
[58] Field of Search ............ 222/1, 193, 77; 302/53, 302/54, 55

[56] References Cited
UNITED STATES PATENTS

| | | | |
|---|---|---|---|
| 3,333,774 | 8/1967 | Demaison | 302/53 X |
| 3,091,369 | 5/1963 | Sackett | 222/77 |
| 3,001,829 | 9/1961 | De Saint-Martin | 302/53 |
| 3,604,758 | 9/1971 | Flain et al. | 302/53 X |

Primary Examiner—Robert B. Reeves
Assistant Examiner—John P. Shannon
Attorney, Agent, or Firm—Burgess, Dinklage & Sprung

[57] ABSTRACT

An improvement in a process for dispensing a fluidizable solid from the lower portion of a pressure vessel equipped with a weighing device, a closable supply, a discharge, and a source of three gas flows, a first of which is applied within the vessel at a level above the solid to be fluidized, a second of which is applied within said vessel in a lower portion thereof, and a third of which is applied within the discharge orifice of the vessel, which discharge orifice terminates in a chamber, which improvement involves determining the amount of solid dispensed and determining the throughflow of gas in relationship to the amount of solid dispensed to maintain a constant gas/solid ratio while maintaining the pressures such that the pressure applied to the lower portion of the vessel is greater than the pressure applied at a level above of the solids which, in turn, is greater than the pressure applied to the discharge orifice, all of which are greater than the pressure maintained within the chamber, and an apparatus for carrying out the process embodying control devices to maintain the desired constant predetermined gas/solid ratio.

15 Claims, 3 Drawing Figures

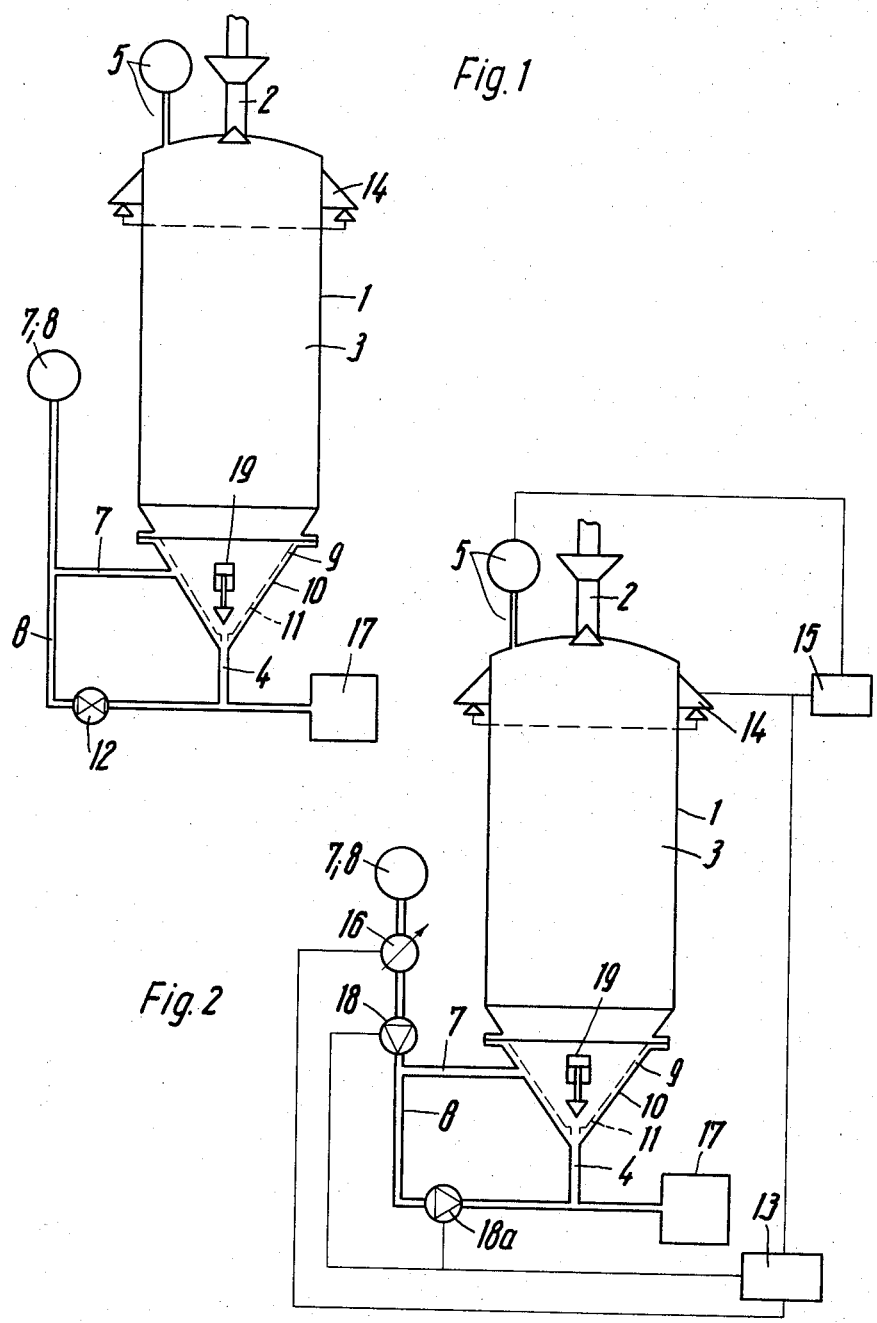

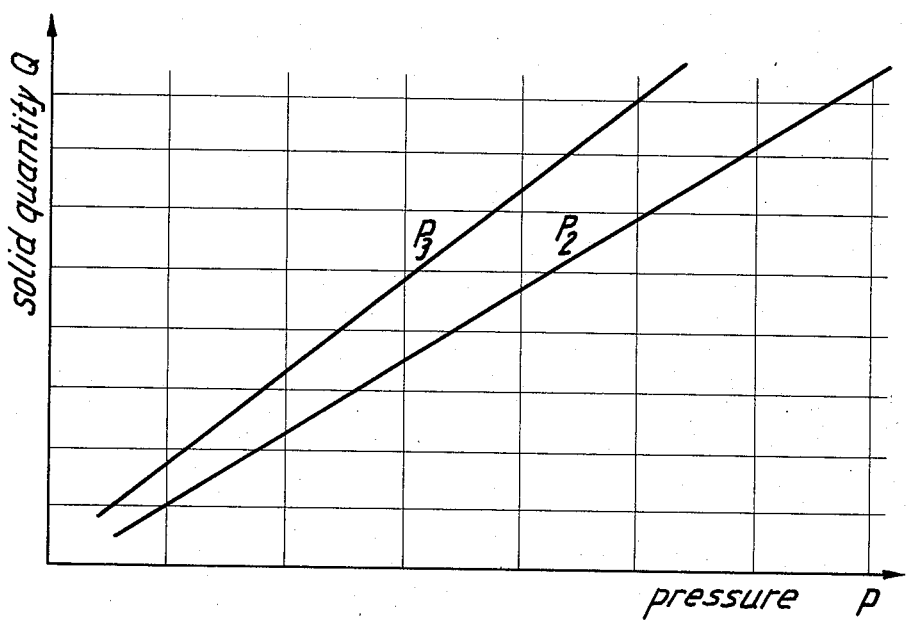

METHOD AND APPARATUS FOR DISPENSING A FLUIDIZABLE SOLID FROM A PRESSURE VESSEL

BACKGROUND OF THE INVENTION

1. Field of the Invention

The invention relates to a method of dispensing a fluidizable solid from a pressure vessel having a weighing device and closable supply and discharge, wherein of three gas flows which are supplied to the solid and are at various pressure values $P_1$, $P_2$, $P_3$, the gas flow at medium pressure $P_2$ is conducted into the vessel above the solid and the gas flow at relatively high pressure $P_1$ is conducted into the lower vessel region for fluidizing the solid, and the gas flow or relatively low pressure $P_3$ is conducted into the discharge connected thereto, the latter opening into a chamber at very low pressure $P_4$, and the quantity of solid taken from the vessel being weighed and also to an apparatus for carrying out the method.

2. Discussion of the Prior Art

Some method steps and the apparatus required for these in the method described hereinbefore are known from publications: German Auslegeschrift No. 1,140,863, German Pat. No. 1,147,756 and German Auslegeschrift No. 1,148,938.

Further developments on the basis of these have led to a known procedure and an apparatus such as is illustrated in FIG. 1 and FIG. 3 of the accompanying drawings and will be described in detail hereinafter.

In FIG. 1, the apparatus includes a pressure vessel 1 having a closable charging aperture 2 through which solid 3 is introduced and a closable discharge 4, 19. Conduits 5, 7 and 8 are connected to gas pressure sources and a pressure reducing valve 12 is provided. The gas pressure conduit 7 leads into a chamber 9 formed between the vessel bottom end 10 and a second bottom end 11 which is arranged above bottom 10 and which is gas-pervious. A weighing device 14 for the solid 3 is connected to the vessel 1. There is a dispensing or consumption chamber 17 in which a very low pressure $P_4$ prevails.

The known apparatus illustrated operates as follows:

With the discharge 4 closed, the pressure vessel 1 is filled with a solid 3 in powder form. The charging aperture 2 is closed and the gas pressure sources 5, 7, 8 are connected, the gas pressure source 5 being used for regulating the top pressure $P_2$ the gas pressure source 7 for fluidizing the solid at pressure $P_1$ and the gas pressure source 8 for supplying the "conveying gas" at pressure $P_3$. The gas supplied to the chamber 17 and providing pressure $P_4$ is the gas from the pressure source through 7 and the gas from the pressure source through 8. The prerequisite for conveying the fluidized solid is that the pressure relationship should be $P_1 > P_2 > P_3 > P_4$, $P_1$ being the pressure of the second gas pressure source through 7, $P_2$ the pressure of the first gas pressure source through 5, $P_3$ the pressure of the third gas pressure source through 8 and $P_4$ the pressure in the chamber 17. By means of the weighing apparatus 14 the quantity of solid to be dispensed from the vessel is determined. The known method is based on the relationship shown in FIG. 3, according to which the conveyed quantity of solid O (e.g., in kg/min) depends on the pressure difference $P_2 - P_3$: $Q = \text{const.} (P_2 - P_3)$.

If the weighing apparatus 14 indicates for example that insufficient solid 3 is being conveyed, the top pressure $P_2$ is increased above the solid 3 in the vessel 1. As FIG. 3 shows more particularly, with rising top pressure $P_2$, plotted on the abscissa, the conveyed quantity of solid Q plotted on the ordinate is increased. Owing to the increased quantity of solid Q per volume unit conveyed, however, the pressure $P_3$ of the conveying gas is also increased, but to a lesser extent than the top pressure $P_2$. Consequently, with increasing top pressure $P_2$ the difference between top pressure $P_2$ and conveying pressure $P_3$ increases, this being therefore in direct relationship to the throughflow of the quantity of solid. This relationship is usually used for controlling the throughflow of the solid concerned.

To reduce the conveyed solid quantity Q the top pressure $P_2$ is reduced in accordance with the procedure described. A device for discharging gas can be provided additionally at the upper end of the vessel.

The control described does not influence the gas flow at relatively high pressure and the gas flow at relatively low pressure $P_2$, $P_3$, which exclusively determine the gas quantity and therefore the relation of gas to solid. The pressure reducing valve 12 which is associated with the third gas pressure through 8 and which operates like a proportional controller without a servo force, also discharges varying gas quantities if the pressure $P_4$ in the chamber 17 of lowest pressure fluctuates. This would be the case for example when moving an immersion lance into a molten metal bath. The pressure reducing valve 12 provided has the result, when this pressure change occurs, of producing the conveyance of a smaller quantity of gas. On the other hand the pressure reducing valve 12 when the pressure $P_4$ falls operates in such a manner that an increased quantity of gas is conveyed, in order thus to re-establish constant pressure conditions.

This has the result that for example when moving an immersion lance into and out of a torpedo ladle, with high throughflow quantities, liquid metal is thrown out of the ladle. To avoid this it is necessary to limit the degree to which the torpedo ladle is filled, thus reducing the working capacity.

In the constructional form described in FIG. 1 there also occurred when there was a considerable pressure drop in the chamber 17 of the very low pressure $P_4$, blockages in the region of the chamber 9 since the opening of the pressure reducing valve 12 which results caused a corresponding pressure drop of $P_1$ in the chamber 9 and the pressure $P_1$ became too small in relation to the pressure $P_2$. The results of this are inadequate fluidization of the solid and non-uniform dispensing.

SUMMARY OF THE INVENTION

Broadly, this invention contemplates an improvement in a process for dispensing a fluidizable solid from the lower portion of a pressure vessel having a weighing device, a closable supply, a discharge, a source of three gas flows, one of which is applied within the vessel at a level above the solid to be fluidized at a pressure $P_2$, a second of which is applied within said vessel in the lower portion of said vessel at a pressure $P_1$, a third of which is applied within the discharge orifice at a pressure $P_3$, said discharge orifice terminating in a chamber maintained under a pressure $P_4$, the improvement which comprises determining the amount of solid dispensed at said weighing device, determining the throughflow quantity of gas flow, said throughflow quantity of gas flow being the sum of the amount of gas at $P_1$ and $P_3$, and regulating the amount of gas and amount of solid to maintain a predetermined constant gas/solid dispensed ratio under conditions such that $P_1>P_2>P_3>P_4$.

In a particularly desirable embodiment, this invention contemplates an improvement in an apparatus for dispensing a fluidizable solid from the lower portion of a pressure vessel having a weighing device, a closable supply, a discharge, a source of three gas flows, a first of which terminates within the vessel at a level above the solid to be dispensed in an upper portion thereof, a second of which terminates within the vessel in a lower portion thereof, a third of which terminates in said discharge, said discharge connected to a chamber, the improvement comprising means in association with said weighing device to determine the amount of a solid dispensed into said vessel, means for determining the sum of the gas throughput of the gases from the second and third gas source, and regulating means for regulating the gas and solid to maintain a constant gas/solid ratio.

The apparatus of the present invention is particularly useful in carrying out a process wherein calcium carbide is fed through immersion lances into a pig iron desulphurization process whereby the amount of calcium carbide throughflow can be regulated to a desired high value in the range of 40 to 250 kg/min. while maintaining a constant ratio of gas to solid dispensed in the range of 2 to 20 Nl/kg. The present invention increases the efficiency of the pressure vessel and the solid fluidization process. It eliminates pressure fluctuations which in turn can affect the amount of solid fluidized into a subsequent process which can introduce less than optimum uniformity in the second process with respect to the process conditions and the products obtained. Additionally, excess quantities of gas emanating from the pressure vessel are eliminated such that only the amount of gas needed for the fluidization need be employed.

The present invention has as its object to improve the conditions obtaining with the above-described method.

According to the invention the throughflow quantity of solid and also the throughflow quantity of the gas flow, being that at relatively high and relatively low pressure ($P_1$ and $P_3$), are regulated in accordance with a predetermined constant gas/solid ratio so as to maintain that ratio during operation.

Preferably, the control of the throughflow quantity of the solid is effected by means of a pressure variation of the gas flow at medium pressure, $P_2$.

It is of particular advantage to control the throughflow quantity of the gas flow ($P_1$ and $P_3$) by reference to the throughflow quantity of solid.

Preferably, to control the throughflow quantities of the gas flow only the gas flow of relatively low pressure, $P_3$, is regulated.

The method according to the invention is particularly suitable in applications where solids in powder form are introduced into molten metal. It is more particularly suitable for the desulphurization of pig iron by means of an immersion lance, the solid throughflow (e.g., of calcium carbide) being regulated to a desired value of 40–250 kg/min, preferably 100–140 kg/min, and the gas/solid ratio to 2–20 Nl/Kg, preferably 4–10 Nl/kg.

To carry out the method according to the invention a particularly suitable apparatus includes a pressure vessel having a weighing apparatus, a closable charging aperture for the solid in the upper region, and in the lower region a closable discharge, a first regulatable gas pressure source connected to the upper vessel region to provide gas flow at medium pressure $P_2$, a third regulatable gas pressure supply connected to the discharge to provide the gas flow at relatively low pressure $P_3$, and a second gas pressure supply connected to the lower vessel region for the gas flow at relatively high pressure $P_1$, the second gas pressure supply opening into a chamber between the vessel bottom end and a gas-pervious second bottom end arranged thereabove, and respective control devices being provided one for the gas throughflow quantity, being that from the second and third gas pressure supplies, and the other for the quantity of solid dispensed.

In a preferred constructional form, the control device for the gas throughflow quantity acts on a valve of the third gas pressure supply. The gas throughflow quantity of the second and third gas pressure supplies is ascertained with a meter.

In a further preferred constructional form, the control device for dispensing solid material receives from the weighing apparatus an actual value for the solid quantity dispensed and regulates the pressure $P_2$ from the first gas pressure source in accordance with the deviation between actual and desired values.

BRIEF DESCRIPTION OF DRAWINGS

Referring again to the attached drawings:

FIG. 1 is a cross sectional diagrammatic view of an apparatus according to the prior art whose operation is described above;

FIG. 2 is a cross sectional diagrammatic view of the elevation of the apparatus of the present invention employed to carry out the claimed process; and FIG. 3 is a graph showing the amount of conveyed material against pressure.

DESCRIPTION OF SPECIFIC EMBODIMENTS

It is particularly suitable to use a device wherein the actual value of the solid quantity dispensed is used for the control device for the gas throughflow quantity of the second and third gas pressure sources as a desired value. One embodiment of the invention is shown diagrammatically in FIG. 2 of the accompanying drawing and will be described in detail hereinafter.

Like the known apparatus previously described, this apparatus includes a pressure vessel 1 with a closable charging aperture 2 and a discharge 4 closable by a plug 19 for the solid 3. For fluidization, the double-walled bottom end is composed of the vessel bottom end 10, the second gas-pervious bottom end 11 and the chamber 9 situated therebetween. Opening from above into the pressure vessel 1 is a first gas pressure supply 5 under a pressure $P_2$, into the chamber 9 opens the second gas pressure supply 7 at pressure $P_1$ and into the discharge 4 the third gas pressure supply 8 at the pressure $P_3$. From the discharge 4, a conduit leads to a chamber 17 which is at very low pressure $P_4$. Here also conveyance requires that $P_1>P_2>P_3>P_4$. The weighing device 14 is also provided for metering the quantity of solid dispensed at the pressure vessel 1.

A control device 15 is associated with the weighing device 14 which compares the actual value given by the weighing device with a desired value and in accordance with the result regulates the pressure $P_2$ of the first gas pressure supply. There is also provided in the conduits leading from the second and third gas pressure sources 7, 8 to the chamber 9 and the discharge 4 a meter 16 for metering the gas throughflow quantity (being the gas at $P_1$ plus that at $P_3$) and also, connected thereto, a regulatable valve 18 or 18a. To regulate the gas throughflow quantity of the second and third gas pressure supplies from sources 7, 8 there is provided a further control device 13 which receives the actual value of the dispensed quantity of solid from weighing device 14 and sets up this value, taking into account a preset desired constant gas/solid ratio, as the appropriate desired value for the gas throughflow quantity. Thus the control devices 13,15 regulate the throughflow quantities of solid and gas to maintain the preset constant ratio.

In a particular example of the desulphurisation of pig iron with the immersion lance process the method of operation would be as follows:

Assume that the desired gas/solid ratio (Air/Calcium Carbide) is to amount to 5 Nl/kg. At the beginning of treatment the immersion depth of the lance is estimated and for example a pressure $P_2$ is set by means of the first gas pressure source 5 in accordance with FIG. 3 to a value which corresponds approximately to the desired value of the solid flow. Likewise an initial position is selected for the valves 18 or 18a in the supply conduits of the second and third gas pressure supplies, so that the desired ratio of air to calcium carbide is approximately reached. Then the immersion lance is moved in and the treatment of the pig iron begun. The quantity of solid dispensed per unit of time is examined by the control device 15. If the actual value does not correspond to the present desired value, the pressure $P_2$ is adjusted. Also the actual value of the quantity of solid dispensed is continuously monitored by means of the control device 13 and taking the predetermined gas/solid ratio into account is converted into the desired value for the regulation of the air quantity.

According to above-described method within the invention uniform delivery of solid is achieved since the control of the volumes of solid and gas, taking normal conditions into account for the gas, avoids the use and any disadvantageous operation of the pressure reducing valve 12 which was described initially. The known pressure reducing valve 12 operating as a proportional controller without servo force is not necessary in the apparatus within the invention. However, to maintain desired pressure conditions a manually adjustable pressure reducing valve can be arranged at the valve 18 (in desulphurisation, e.g., 1½ to 2 atmospheres excess pressure) between the gas pressure source 7, 8 and the valve 18,18a.

A further advantage is that pressure fluctuations in the chamber 17 do not cause any sudden changes in the gas delivery quantity, whereby pulsating conveyance is obviated. Furthermore there are no longer the excessive gas quantities delivered when the immersion lance is put in and taken out, which led to the throwing-out of molten metal initially described. Blockages owing to inadequate fluidisation no longer occur. It is of particular practical importance that the gas-solid ratio remains constant, which is of significance more particularly when using the invention in the field of metallurgy. For example, it has been found possible by the above method to increase to 95 percent the capacity of torpedo ladles, which was limited to 80 percent with the previously described known methods.

It should be stressed that the use of the above method within the invention has been found to be advantageous also for the introduction of other fine-grain or powder-form solids into molten metal baths, e.g., for the introduction of silicon or aluminium into iron melts.

It is to be understood that the apparatus of the present invention is characterized by a first source of gas flow disposed in an upper region of the pressure vessel, i.e., terminating in the upper region or portion of the pressure vessel. By the term "upper region or portion" is meant the upper half of the vessel, similarly with respect to the second source of gas located in the lower portion of the vessel, it should be understood that the term "lower portion" refers to the bottom half of the vessel. Preferably, this latter second source of gas is disposed in an inverted conically shaped at the bottom of the vessel and terminates in a confined region defined by an inside wall of the inverted conically shaped zone and a liner disposed thereover which is gas-pervious. Preferably, the first gas source is disposed at the top of the vessel, and in any event, above the means for supplying solid to the vessel.

What is claimed is:

1. In a process for dispensing fluidizable solid from the lower portion of a pressure vessel having a weighing device at which said solid is dispensed, a closable supply, a discharge, a source of three gas flows, one of which is applied within the vessel at a level above the solid to be fluidized at a pressure $P_2$, a second of which is applied within said vessel in the lower portion of said vessel at a pressure $P_1$, a third of which is applied within the discharge orifice at a pressure $P_3$, said discharge orifice terminating in a chamber maintained under a pressure $P_4$, the improvement which comprises determining the amount of solid dispensed at said weighing device, determining the throughflow quantity of gas flow, said throughflow quantity of gas flow being the sum of the amount of gas having a pressure $P_1$ and the amount of gas having a pressure $P_3$ and regulating the amount of gas and amount of solid to maintain a predetermined constant gas/solid dispensed ratio under conditions such that $P_1 > P_2 > P_3 > P_4$.

2. An improvement according to claim 1 wherein the ratio of gas to solid dispensed is regulated by varying the pressure of the gas at pressure $P_2$.

3. An improvement according to claim 2 wherein the throughflow quantity of gas is controlled in response to the throughflow quantity of solid determined to have been dispensed at said weighing device.

4. A method according to claim 1 wherein the throughflow quantity of the gas flow is controlled by varying only the gas flow at pressure $P_3$ and maintaining the gas at pressure $P_1$ at constant pressure.

5. A method according to claim 1, wherein the solid is in powder form and is dispensed into a metal melt.

6. A method according to claim 5, wherein a desulfurizing agent is fluidized and dispensed from said vessel at a rate between 40 and 250 kg/min, the gas/solid ratio is maintained at a value in the range from 2 to 20 Nl/kg and said agent is directed into a pig iron desulphurization process through an immersion lance.

7. A method according to claim 6 wherein the desulfurizing agent is calcium carbide.

8. A method according to claim 6 wherein the solid throughflow rate is between 100 and 140 kg/min and the gas/solid ratio is between 4 and 10 Nl/kg.

9. In an apparatus for dispensing a fluidizable solid from the lower portion of a pressure vessel having a weighing device, a closable supply, a discharge, a source of three gas flows, a first of which terminates within the vessel at a level above the solid in an upper portion thereof, a second of which terminates within the vessel in a lower portion thereof, a third of which terminates in said discharge, said discharge connected to a chamber, the improvement which comprises means in association with said weighing device to determine the amount of a solid dispensed into said vessel, means for determining the amount of gas throughput of the gases from second and third gas sources, and regulating means for regulating the gas and solid to maintain a constant gas/solid ratio.

10. An improvement according to claim 9 wherein said regulating means is in operative association with a flow controlling means on the third gas source.

11. An improvement according to claim 9 wherein means are provided in association with the first gas source to regulate the pressure thereof, said means responsive to an actual value measured by weighing device for solid dispensed.

12. An improvement according to claim 7 wherein a control device is provided to regulate the quantity of the gas throughflow which device is responsive to the actual value of quantity of solid dispensed.

13. In a device for dispensing a fluidizable solid from a pressure vessel having a weighing device, said vessel having in its upper portion a closable feed aperture and a gas line having a first controllable gas pressure source of pressure $P_2$, said vessel having in the lower portion thereof a loosening bottom and a closable discharge opening, said discharge opening having a discharge line, said discharge line discharging into a chamber of pressure $P_4$, said vessel having in the loosening bottom and in the discharge line a second and third line discharge having a second controllable gas pressure source for a gas stream of pressure $P_1$ and a third controllable gas pressure source at pressure $P_3$, the improvement to maintain a gas quantity/solid quantity ratio constant which comprises a first regulating means for the solid quantity which first regulating means is operable to compare the actual value of the solid quantity measured by means of the weighing device which has a preset desired value, which first regulating means is operable to adjust the pressure of the gas stream of pressure $P_2$ by means of said first controllable gas pressure source by synchronous adjustment thereof, a second regulating means for the gas quantity of the respective gas streams of pressures $P_1$ and $P_3$, which second regulating means receives the actual value of the gas quantity and the actual value of the solid quantity measured by the weighing device and, in the event of deviation from the gas quantity/solid quantity ratio to be maintained constant, adjusts the quantity by means of said second controllable gas pressure source to a constant preselected value, said device having magnitudes of pressure such that the following relationship is maintained: $P_1 > P_2 > P_3 > P_4$.

14. A device according to claim 13 wherein said second regulating means is responsive to a measuring device arranged following the second controllable gas pressure source and adjusts the gas quantity of gas at pressures $P_1$ and $P_3$, respectively, through control valves.

15. A device according to claim 13 wherein said second regulating means adjusts only the gas quantity of the gas stream at pressure $P_3$ by means of a control valve.

* * * * *

UNITED STATES PATENT OFFICE
CERTIFICATE OF CORRECTION

Patent No. 3,807,602              Dated April 30, 1974

Inventor(s) WALTER MEICHSNER

It is certified that error appears in the above-identified patent and that said Letters Patent are hereby corrected as shown below:

Column 1, item [73] "August Thyssen-Hutte" should read -- August Thyssen-Hütte --.

Column 5, line 38, "present" should read -- preset --.

Signed and sealed this 1st day of October 1974.

(SEAL)
Attest:

McCOY M. GIBSON JR.
Attesting Officer

C. MARSHALL DANN
Commissioner of Patents